United States Patent [19]

Adelman

[11] 3,723,570

[45] Mar. 27, 1973

[54] ETHYLENE-VINYL ACETATE-ALLYL GLYCIDYL ETHER TERPOLYMER WITH POLYVINYL CHLORIDE

[75] Inventor: Robert Leonard Adelman, Wilmington, Del.

[73] Assignee: E. I. du Pont de Nemours and Company, Wilmington, Del.

[22] Filed: July 29, 1971

[21] Appl. No.: 167,467

Related U.S. Application Data

[60] Division of Ser. No. 843,858, July 22, 1969, which is a continuation-in-part of Ser. No. 441,354, March 19, 1965, abandoned.

[52] U.S. Cl..........260/836, 260/45.7 P, 260/45.75 R, 260/45.75 K, 260/80.72, 260/830 P
[51] Int. Cl. ..............................................C08g 45/04
[58] Field of Search......................................260/836

[56] References Cited

UNITED STATES PATENTS

| | | | |
|---|---|---|---|
| 3,100,758 | 8/1968 | Ravve | 260/836 |
| 3,301,919 | 1/1967 | Cenci | 260/836 |
| 3,317,635 | 6/1967 | Osmond | 260/836 |
| 3,382,297 | 5/1968 | Thompson | 260/836 |
| 3,388,190 | 6/1968 | Bryant | 260/836 |

*Primary Examiner*—Paul Lieberman
*Attorney*—Thomas E. Currier

[57] ABSTRACT

Specific copolymers of ethylene, a vinyl ester, and allyl glycidyl ether are disclosed as being particularly suitable plasticizers for polymers such as polyvinyl chloride. The copolymers have a molecular weight of about 400–3,000 and comprise 15–40 weight percent ethylene, 35–70 weight percent vinyl ester, and 15–35 weight percent allyl glycidyl ether.

4 Claims, No Drawings

ETHYLENE-VINYL ACETATE-ALLYL GLYCIDYL ETHER TERPOLYMER WITH POLYVINYL CHLORIDE

CROSS REFERENCE TO RELATED APPLICATIONS

This application is a division of application Ser. No. 843,858, filed July 22, 1969, which is a continuation-in-part of pending application Ser. No. 441,354, filed Mar. 19, 1965, now abandoned.

BACKGROUND OF INVENTION

While it has been disclosed in the patent literature (U. S. Pat. No. 2,703,794) that ethylene/vinyl ester systems can have minor amounts of a third component such as allyl glycidyl ether, there is no disclosure that, within a specified range, copolymers of ethylene/vinyl ester/allyl glycidyl ether would possess properties making them eminently suitable in themselves as plasticizers for polymers such as polyvinyl chloride.

The bulk of the plasticizer requirement has heretofore been satisfied with esters of phthalic acid, in particular, dioctyl phthalate. However, the vapor pressure of the phthalate esters is not as low as would be desirable for best performance as plasticizers. Also, these monomeric plasticizers tend to migrate to the polymer surface, and are easily extracted by organic solvents or tend to be washed away by aqueous solutions of detergents. The industry has also prepared polymeric plasticizers, which have better long-term aging (lower volatility) and sometimes lower extractability with organic solvents such as alcohol or aliphatic hydrocarbons. However, only the highest quality and most expensive polymeric plasticizers, such as polypropylene sebacate, have good resistance to aqueous alkali as well as good organic solvent resistance. Also, these polymeric plasticizers tend to be extracted from vinyl-coated fabrics when they are submitted to dry-cleaning solvents. Further, even if extraction is slow, the vinyl composition is greatly weakened by exposure to such solvents, due to the swelling effect of the latter. Thus, there is a real need for better and cheaper plasticizers for polyvinyl chloride resins. Mixtures of complex aromatic hydrocarbons have also been utilized for this purpose but are dark in color and have poor compatibility with the polyvinyl chloride resins.

SUMMARY OF INVENTION

According to the present invention, there are provided addition-type copolymers of ethylene/vinyl ester/allyl glycidyl ether having a molecular weight in the range of about 400–3,000 which consist essentially of 15–40 percent ethylene by weight, 35–70 percent vinyl ester by weight and 15–35 percent allyl glycidyl ether by weight. Preferably, the vinyl ester contains from 1-6 carbon atoms in the acid moiety. As used herein, the term "consisting essentially of" means that the recited components are indispensibly necessary; however, other components which do not prevent the advantages of the invention from being realized can also be present.

DESCRIPTION OF PREFERRED EMBODIMENTS

The copolymers of this invention can be prepared, in general, by contacting, reacting and heating together, in the presence of a free radical initiator, and an oxygen-free atmosphere, at a temperature of about 60°–160°C. and an ethylene pressure of about 70–1,000 atmospheres a mixture of a monomeric vinyl ester and monomeric allyl glycidyl ether. Among the free radical initiators which can be used are such peroxides as benzoyl peroxide, lauroyl peroxide, ditertiary butyl peroxide and tert butyl perbenzoate, azo initiators such as alpha,alpha-azobisisobutyronitrile and azo dicyclohexane carbonitrile. While reaction temperatures of 60°–160°C. and pressured of 70–1,000 atmospheres of ethylene can be used, it is preferred to utilize a temperature range of about 70°–90°C. and an ethylene pressure of about 400–600 atmospheres for bulk polymerizations carried out in batch processes. Chain transfer agents such as aldehydes or mercaptans can also be used. However, with a concentration of allyl glycidyl ether of at least 20 percent of the total monomer content, no additional chain transfer agents are necessary to obtain molecular weights of the copolymer of this invention in the range of about 900–1,500.

Weight ratios of the polyvinyl chloride or similar polymer to the copolymer of this invention can be as low as 10/90 or as high as 98/2, depending upon the utility to which the composition is to be put. Thus highly flexible, soft, tough products are possible with the low concentrations of polyvinyl chloride, while quite stiff, hard, yet shock-resistant products are possible with high concentrations of the polyvinyl chloride.

When used as plasticizers for polyvinyl chloride or similar polymers, low molecular weight copolymers, e.g., 400–1,500 and especially 400–900, are particularly suitable when the plasticized compositions are to be further cured or cross-linked as hereinafter described. Due to their low molecular weight and consequent low viscosity, the copolymer can be readily blended into the polyvinyl chloride and the resulting blend easily put into its desired form. In such post curing instances, the high volatility of the copolymer is not a problem since it is polymerized to a much higher molecular weight in the curing step. Where curing is not to be accomplished, molecular weights of 500–3,000 are acceptable with 500–1,500 being preferred.

Blends of the copolymer and the polyvinyl chloride resin can be prepared by any conventional method. For example, a suitable blend may be prepared by milling on a hot roll mill, by casting from a solvent, such as tetrahydrofuran or cyclohexanone, or by working the plasticizer into a dry polyvinyl chloride resin powder to form dry powder blends or suspensions. Solvent systems are particularly suitable with blends containing copolymers with molecular weights of 1,500–3,000. Cured blends can be obtained by heating to 150°–180°C. for 5–30 minutes. The resulting blends are clear, homogeneous and very light in color. Of course, if opaque and/or colored compositions are desired, conventional pigments, dyes, extenders or fillers can be used to accomplish the desired result.

In addition, if further stability to heat and light is desired, small amounts of stabilizers well known to the plasticized vinyl resin art can also be added, such as cadmium compounds, cadmium-barium salt blends, lead phosphites, tribasic lead sulfate or other lead salts, organic phosphites, organo-tin or tin salts, organic phosphates.

For a clearer understanding of the invention, the following specific examples are given. These examples are meant to be merely illustrative of the invention and not in limitation thereof. Unless otherwise indicated, parts and percentages are expressed on a weight basis.

EXAMPLE 1

To a stainless steel rocker bomb having a capacity of 400 milliliters, there was added a mixture of 40 grams of allyl glycidyl ether, 120 grams of vinyl acetate and 5 grams of benzoyl peroxide. The rocker bomb was then evacuated, flushed with nitrogen, reevacuated and pressured to 470–500 atmospheres with ethylene. The rocker was then started and the temperature brought to and maintained at 80°C. for a period of 6 hours. The unchanged allyl glycidyl ether and vinyl ester were removed by evaporation under reduced pressure at 50°–60°C. There was recovered a conversion product of 78 grams of viscous liquid. Based upon an epoxide analysis (HC1 in pyridine) and from an elemental carbon-hydrogen analysis, the percentage composition of the ethylene/vinyl acetate/allyl glycidyl ether copolymer was 36/49/15. Ebullioscopic molecular weights were calculated with the first determination being 1,330 and the second 1,350. The epoxy equivalent was calculated as 760 with the average number of epoxy groups/chain being 1.8 and with bulk viscosity in poises at 60°C. being less than 148.

EXAMPLE 2

To a stainless steel rocker bomb having a capacity of 400 milliliters, there was added a mixture of 80 grams of allyl glycidyl ether, 80 grams of vinyl acetate and 5 grams of benzoyl peroxide. The rocker bomb was then evacuated, flushed with nitrogen, reevacuated and pressured to 460–500 atmospheres with ethylene. The rocker was then started and the temperature brought to and maintained at 80°C. for a period of 6 hours. The unchanged allyl glycidyl ether and vinyl ester were removed by evaporation under reduced pressure at 50°–60°C. There was recovered a conversion product of 46 grams of a viscous liquid. Based upon an epoxide analysis (HC1 in pyridine) and from an elemental carbon-hydrogen analysis, the percentage composition of the ethylene/vinyl acetate/allyl glycidyl ether terpolymer was 35/40/25. Ebullioscopic molecular weights were calculated with the first determination being 1,030 and the second 1,060. The epoxy equivalent was calculated as 456 with the average number of epoxy groups/chain being 2.3 and with bulk viscosity in poises at 50°C. being 27, and approximately 150 at 25°C.

EXAMPLE 3

To stainless steel rocker bomb having a capacity of 400 milliliters, there was added a mixture of 80 grams of allyl glycidyl ether, 80 grams of vinyl acetate and 5 grams of benzoyl peroxide. The rocker bomb was then evacuated, flushed with nitrogen, reevacuated and pressured to 900 to 980 atmospheres with ethylene. The rocker was then started and the temperature brought to and maintained at 80°C. for a period of 6 hours. The unchanged allyl glycidyl ether and vinyl ester were removed by evaporation under reduced pressure at 50°–60°C. There was recovered a conversion product of 47 grams of a viscous liquid. Based upon an epoxide analysis (HC1 in pyridine) and from an elemental carbon-hydrogen analysis, the percentage composition of the ethylene/vinyl acetate/allyl glycidyl ether copolymer was 40/36/24. Ebullioscopic molecular weights were calculated with the first determination being 1,020 and the second 1,150. The epoxy equivalent was calculated as 475 with the average number of epoxy groups/chain being 2.2 and with bulk viscosity in poises at 50°C. being 43.

EXAMPLE 4

To a stainless steel rocker bomb having a capacity of 500 milliliters, there was added a mixture of 80 grams of allyl glycidyl ether, 80 grams of vinyl propionate and 5 grams of benzoyl peroxide. The rocker bomb was then evacuated, flushed with nitrogen, reevacuated and pressured to 73 atmospheres with ethylene. The rocker was then started and the temperature brought to and maintained at 80°C. for a period of 6 hours. The unchanged allyl glycidyl ether and vinyl ester were removed by evaporation under reduced pressure at 50°–60°C. There was recovered a conversion product of 36 grams of a viscous liquid. Based upon an epoxide analysis (HC1 in pyridine) and from an elemental carbon-hydrogen analysis, the percentage composition of the ethylene/vinyl propionate/allyl glycidyl ether copolymer was 18/52/30. Ebullioscopic molecular weights were calculated with the first determination being 980 and the second 1,000. The average number of epoxy groups/chain was 2.6 and the bulk viscosity in poises at 27°C. being 98.5.

EXAMPLE 5

To a stainless steel rocker bomb having a capacity of 500 milliliters, there was added a mixture of 40 grams of allyl glycidyl ether, 120 grams of vinyl propionate and 5 grams of benzoyl peroxide. The rocker bomb was then evacuated, flushed with nitrogen, reevacuated and pressured to 68 atmospheres with ethylene. The rocker was then started and the temperature brought to and maintained at 80°C. for a period of 6 hours. The unchanged allyl glycidyl ether and vinyl ester were removed by evaporation under reduced pressure at 50°–60°C. There was recovered a conversion product of 70 grams of a viscous liquid. Based upon an epoxide analysis (HC1 in pyridine) and from an elemental carbon-hydrogen analysis, the percentage composition of the ethylene/vinyl propionate/allyl glycidyl ether copolymer was 18/66/16. Ebullioscopic molecular weights were calculated with the first determination being 1,300 and the second 1,310. The average number of epoxy groups/chain was 1.9 and the bulk viscosity in poises at 27°C. was approximately 148, and at 50°C. was in the range of from about 46–63.

EXAMPLE 6

To a stainless steel rocker bomb having a capacity of 500 milliliters, there was added a mixture of 80 grams of allyl glycidyl ether, 80 grams of vinyl propionate and 5 grams of benzoyl peroxide. The rocker bomb was then evacuated, flushed with nitrogen, reevacuated and pressured to 500 atmospheres with ethylene. The rocker was then started and the temperature brought to and maintained at 82°C. for a period of 6 hours. The unchanged allyl glycidyl ether and vinyl ester were removed by evaporation under reduced pressure at 50°–60°C. There was recovered a conversion product of 47 grams of a viscous liquid. Based upon an epoxide analysis (HC1 in pyridine) and from an elemental carbon-hydrogen analysis, the percentage composition of the ethylene/vinyl propionate/allyl glycidyl ether copolymer was 36/42/22. Ebullioscopic molecular weights were calculated with the first determination being 1,200 and the second 1,140. The average number of epoxy groups/chain was 2.2 and the bulk viscosity in poises at 27°C. was 46–63.

EXAMPLE 7

Table 1 provides a comparison of the mechanical properties and extraction characteristics of various plasticizers. In testing, samples were conditioned in a constant temperature room at 72°F. and 50 percent relative humidity for a least 16 hours before tests were carried out. Relative volatilities were determined by the weight loss of 0.007–0.014 inch thick films which were hung in a circulating air over at 85°C. for 48 hours.

Extractabilities by detergent solutions were determined by the weight loss of 0.009–0.021 inch thick films after exposure to a 1 percent commercial anionic detergent ("Tide") solution at 60°C. for 24 hours. The films were then rinsed with water, wiped dry with cheesecloth, dried in an air oven at 85°C. for 45 minutes and reconditioned before reweighing. Extraction by oil was determined by the weight loss of 0.010 to 0.018 inch thick films which were immersed in white mineral oil (Primol D, Esso Standard Oil Co.) at 72°F. for 10 days, the oil being changed after the fifth day. The films were dried with cheesecloth, conditioned, wiped dry again with cheesecloth and reweighed.

Blends were prepared either by (1) working 10–12 gm. samples of polymer, plasticizer, and stabilizer (if used) on a conventional small rubber mill for 10 minutes or (2) mixing plastisol grade 100 percent polyvinyl chloride with the plasticizer for 15 minutes. Bars were prepared by compression molding the sheet or plastisol in a stainless steel race, cut out to give 2.2 inch × 0.6 inch × 0.065 inch moldings, and between aluminum sheets at 170°C. for 5 min. at 2,000 p.s.i.

Very thin films (0.008 inch) for volatility tests were obtained by compression molding at the above conditions, but without the use of any shims. Films 0.020 inch thick for extraction tests were prepared by compression molding at 150°C. for 5 minutes at 2,000 p.s.i. between 10 mil shims.

The mechanical properties which are shown in Tables I and II were determined as follows. The tensile strength was determined on four dumbbell-shaped specimens which were stamped out of 2.2 inch × 0.6 inch × 0.065 inch moldings. The dumbbell dimensions were such that the length was 2 inches, the bell-shaped areas were 0.3 inch in width, and the elongated center sections were 1 inch × 0.10 inch × 0.065 inch. The samples were pulled in the Instron, C-cell, at 10 inches per minute crosshead speed and the distance between jaws being 1 inch (strain rate 1,000 percent per minute). The elongation at break was estimated by the jaw separation at break (the differences between the jaw separation at break and the 1 inch bench marks placed on the neck of the specimen before pull were negligible). Loads at 40 percent elongation and 140percent elongation were read off the stress-elongation chart of the tensile strength chart.

Table II illustrates the resistance to extraction by dry-cleaning solvents and to gasoline, and also the mechanical properties which are obtained from polyvinyl chloride plastisols based on the ethylene/vinyl acetate/allyl glycidyl ether copolymers formulated with various reactive components. Extraction by gasoline was determined by the weight loss of 0.008 inch to 0.020 inch thick film which were immerced in white, non-leaded gasoline for 1 hour at 72°C. The specimens were wiped with cheesecloth, dried at 85°C. for 45 min. in a circulating air oven and reconditioned as hereinbefore. Sensitivity to perchloroethylene was estimated by the weight loss of 0.065 inch discs which were immersed in the solvent for 24 hours at 72°F.

TABLE I

| *Polyvinyl Chloride/ Plasticizer Ratio | Plasticizer Composition | Color | Mechanical Properties | Volatility | Extraction Oil | Extraction Gas | Extraction "Tide" |
|---|---|---|---|---|---|---|---|
| 2/1 | Dioctyl phthalate | fair–poor | excellent | fair | 6.6 | 25.0 | 1.8 |
| 2/1 | Harflex 300 (polyester mfgd. by Wallace and Tiernan Company) | fair | good | good | 3.6 | 1.7 | 10.1 |
| 2/1 | Paraplex G-25 (polypropylene sebacate mfgd. by Rohm & Haas Co.) | fair | good | good | 0.4 | 0.6 | 1.7 |
| 2/1 | E/Vac/AGE (36/49/15) | excellent | good | good | 0.2 | 0.1 | 1.1 |
| 2/1 | E/Vac/AGE (35/40/25) | excellent | good | good | 0.2 | 1.0 | 2.1 |
| 2/1 | E/V Prop/AGE (18/52/30) mol. wt. 990 | excellent | fair–good | good | 0.07 | 0.81 | 2.1 |
| 2/1 | E/V Prop/AGE (18/66/16) | excellent | fair | good | 0.07 | 0.60 | 1.0 |

*"Geon 101", a 100%, high molecular weight polyvinyl chloride manufactured by Goodrich Rubber Company.

TABLE II

| Composition with "Geon 121" polyvinyl chloride | Percent in total composition | Percentage Weight Loss | | Tensile (p.s.i.) | Elongation (%) | 40 percent Modulus (p.s.i.) |
|---|---|---|---|---|---|---|
| | | Perchloroethylene ("Perclene") | Gasoline | | | |
| 1) Dioctyl phthalate | 30 | 30 | 30 | 1960 | 230 | 470 |
| 2) "Harflex" 300 | 30 | 30 | 1.6 | 2660 | 325 | 630 |
| 3) "Paraplex" G-25 | 30 | — | 1.5 | 2670 | 260 | 840 |
| | 50 | — | — | 1960 | 380 | 330 |
| 4) E/Vac/AGE (40/36/24 and mol. wt. of 1090) | 33 | 4.4 | 1.9 | 3930 | 43 | 3,830 |
| Tetrapropenylsuccinic anhydride | 17 | | | | | |
| Tri(dimethylaminomethyl) phenol | 2 | | | | | |
| 5) E/Vac/AGE (40/36/24 and mol. wt. of 1090) | 37 | 4.8 | 2.7 | 2270 | 140 | 1,360 |
| Diethyl chlorophosphate | 12 | | | | | |
| Tri(dimethylaminomethyl) phenol | 0.5 | | | | | |
| 6) E/Vac/AGE (40/36/24 and mol. wt. of 1090) | 25 | 0.3 | 1.9 | — | — | — |
| Diallyl phthalate | 20 | | | | | |
| Maleic ahnydride | 5 | | | | | |
| Dicumyl peroxide | 1 | | | | | |
| Tri(dimethylaminomethyl) phenol | 1 | | | | | |

Although the examples hereinbefore have illustrated the use of the novel copolymer of this invention as a plasticizer for polyvinyl chloride, it should be obvious that the beneficial results can also be achieved when used with such polymers as polyvinyl esters, polyvinyl formals, polyvinyl butyrals, ethylene/vinyl acetate copolymers and terpolymers and polyamides. Additionally, the term polyvinyl chloride resin is meant to include copolymers of vinyl chloride with vinyl esters such as vinyl acetate, acrylate esters, such as methyl acrylate or ethyl acrylate, fumarate, maleate esters such as dimethyl maleate, the half-esters of fumarate, maleic or itaconic acid, with vinylidene chloride, vinyl fluoride, ethylene and other polymerizable monomers containing a single double bond. Also, terpolymers of vinyl chloride, vinyl acetate and maleic acid or other saturated acids or partial hydrolyzed copolymers of vinyl chloride and vinyl esters can be plasticized with the novel copolymers of this invention. In all these copolymers, the vinyl chloride predominates and should provide at least 83 percent by weight of the polymer.

Among the polymers hereinbefore mentioned, those which receive particular advantages are polymers containing a minor percentage of a post-reactive group such as —OH, —COOH, —NH$_2$— and —SH, which on heating with the novel copolymers of this invention will lead to a 100 percent homogeneous, coalesced, cross-linked composition, yet before heating exist as a physical mixture, i.e., a semi-liquid or viscous liquid suspension or dry powder blend, which can easily be added to molds or coating or extrusion equipment.

The present invention provides novel copolymers which are efficient polymeric plasticizers for polyvinyl chloride resins and additionally confer a superior level of oil, gasoline and detergent resistance (see Table I). Moreover, the novel copolymers of this invention have the additional quality of being excellent heat stabilizers and reduce or eliminate the need for providing a 2-5 percent by weight epoxy stabilizer and 2-4 percent by weight barium or cadmium salts or other stabilizers as hereinbefore mentioned which are found in the usual plasticizer formulation. Inasmuch as the latter additives are generally susceptible to extraction by such organic solvents as gasoline, the novel copolymers of this invention have superior durability and aging properties as compared to polyvinyl chloride resin formulations containing conventional stabilizers and plasticizers. A formulation of the novel copolymers of this invention with a minor amount of diethyl chlorophosphate or tetrapropenyl succinic anhydride exhibit greatly reduced extractability with respect to dry-cleaning solvents such as perchloroethylene (see Table II). Additionally, the hereinbefore formulations demonstrate a lower rate of change of stiffness with temperature changes than do commercial polymeric plasticizers.

Polyvinyl chloride resins, plasticized with the copolymers of this invention, have been extended with diallyl phthalate and maleic anhydride to give workable dry powder mixes or plastisols. After application and upon being cured with peroxides and heating, the resulting products are flexible, tough, solvent resistant and exhibit good adhesion with respect to aluminum surfaces.

Since many different embodiments of this invention may be made without departing from the spirit and scope thereof, it is to be understood that the invention is not limited by the specific illustrations except to the extent defined in the following claims.

What is claimed is:

1. A composition comprising (a) from about 2-90 percent by weight of an addition type copolymer of ethylene, a vinyl ester, and allyl glycidal ether, said copolymer having a molecular weight in the range of about 400-3,000 and consisting essentially of about 15-40 percent by weight ethylene, about 35-70 percent by weight vinyl ester having one to six carbon atoms in the acid moiety, and about 15-35 percent by weight allyl glycidyl ether, and (b) from about 98-10 percent by weight of a vinyl chloride polymer containing at least 83 percent by weight of combined vinyl chloride.

2. The composition of claim 1 wherein said vinyl ester is vinyl acetate.

3. The composition of claim 1 wherein said vinyl ester is vinyl propionate.

4. The composition of claim 1 wherein said copolymer has a molecular weight of 500-1,500.

* * * * *